US006533100B2

(12) United States Patent
Wheeler

(10) Patent No.: US 6,533,100 B2
(45) Date of Patent: Mar. 18, 2003

(54) DIRECTION CHANGE INTERFACE CONVEYOR

(75) Inventor: Tracy E. Wheeler, Terre Haute, IN (US)

(73) Assignees: Sony Corporation, Tokyo (JP); Digital Audio Disc Corporation, Terre Haute, IN (US)

( * ) Notice: Subject to any disclaimer, the term of this patent is extended or adjusted under 35 U.S.C. 154(b) by 0 days.

(21) Appl. No.: 09/846,655

(22) Filed: May 1, 2001

(65) Prior Publication Data

US 2002/0162729 A1 Nov. 7, 2002

(51) Int. Cl.[7] .............................................. B65G 47/10
(52) U.S. Cl. ................................ 198/370.1; 198/370.09
(58) Field of Search ........................ 198/370.1, 370.06, 198/370.04, 370.01

(56) References Cited

U.S. PATENT DOCUMENTS

| | | | | |
|---|---|---|---|---|
| 4,926,999 A | * | 5/1990 | Fauth, Sr. et al. | .... 198/370.1 X |
| 4,962,841 A | * | 10/1990 | Kloosterhouse | ........ 198/370.09 |
| 5,165,516 A | * | 11/1992 | Reed et al. | .............. 198/370.1 |
| 5,205,394 A | * | 4/1993 | Zeuschner | ............... 198/370.1 |
| 5,810,346 A | * | 9/1998 | Jorg | .................... 198/370.1 X |

FOREIGN PATENT DOCUMENTS

| | | | | |
|---|---|---|---|---|
| JP | 1-156224 | * | 6/1989 | .............. 198/370.1 |
| JP | 434862 | * | 7/1991 | .............. 198/370.1 |

OTHER PUBLICATIONS 2 pages from catalog, Hytrol Conveyor Company, Inc., May 1999.

* cited by examiner

Primary Examiner—James R. Bidwell
(74) Attorney, Agent, or Firm—Wood, Herron & Evans, L.L.P.

(57) ABSTRACT

A multidirectional conveyor section for moving an article in two different directions. The conveyor section has a first roller conveyor mounted on a frame with at least two rollers adapted to move the article in a first direction. A first belt conveyor is mounted between the two rollers of the first roller conveyor and is capable of moving the article in a second direction different from the first direction. A first cylinder is connected to the frame and has a first cylinder rod connected to the first belt conveyor. The first cylinder moves the first belt conveyor vertically between a first position above the first roller conveyor and a second position below the first roller conveyor to facilitate an exchange of the article between the first roller conveyor and the first belt conveyor.

22 Claims, 5 Drawing Sheets

DIRECTION CHANGE INTERFACE CONVEYOR

FIELD OF THE INVENTION

This invention relates to material handling and more particularly, to a multilevel conveyor section for moving material in different directions.

BACKGROUND OF THE INVENTION

Ongoing efforts to increase the efficiency and output of production operations have resulted in a continuing focus on how materials are moved in a manufacturing environment. In many environments, it is desirable to automatically move materials without human intervention. For example, parts are often buffered or temporarily stored in an interface conveyor. The interface conveyor supplies parts to and receives parts from one or more processing stations. Therefore, the interface conveyor is buffering or storing both preprocessed and postprocessed parts. Further, the preprocessed and postprocessed parts are transferred between the interface conveyor and a material handler, for example, an automated guided vehicle ("AGV"). In many applications, the AGV carries parts at two elevations, that is, at two different vertical levels or heights, thereby increasing the capability and flexibility of the AGV. For example, being able to buffer or carry parts on the AGV at two different heights, doubles the load carrying capacity of the AGV and permits an AGV to simultaneously transfer multiple parts with other part handling equipment, for example, the interface conveyor.

The interface conveyor loads and unloads parts respectively, to and from, the AGV at its end, whereas parts are passed to and from the processing station along the side of the interface conveyor. Hence, the interface conveyor must be capable of moving parts in two different, and normally, mutually perpendicular directions.

Known roller conveyors have crossfeed conveyors that accept parts at right angles to the direction of motion of the roller conveyor by using a plurality of powered O-ring transfers that are elevatable between certain rollers. When it is desirable to accept a part from another conveyor perpendicular to the roller conveyor, the O-ring transfers are lifted above the roller conveyor and provide a conveying motion perpendicular to the direction of motion of the roller conveyor. When the part is conveyed onto the O-ring transfers, the O-ring transfers are lowered, thereby lowering the part onto the roller conveyor for subsequent transfer by the roller conveyor. The mechanical components used by the O-ring transfers of the crossfeed conveyor require a substantial space below the top of the roller conveyor, for example, about 11 inches. Further, the space required for a motor for the O-ring transfers is about an additional 8 inches of space below the roller conveyor.

The AGV used in the application of interest carries parts on conveyors that are at two levels. A lower conveyor is about 10 inches above a floor level, and an upper conveyor is about 27 inches above the floor level. The vertical spacing between the upper and lower conveyors is about 17 inches. The parts being carried by the AGV are about 12 inches high, thus leaving about 5 inches between the tops of the parts and the top of the roller conveyor. Given the space requirements of known crossfeed conveyors associated with a roller conveyor, such known crossfeed conveyors cannot directly exchange parts with the AGV described above. Instead, an intervening material handling device has to receive the parts from the AGV and elevate the parts to the elevation of the crossfeed conveyor. Any such intervening material handling device substantially increases the cost and decreases the efficiency of the part handling process.

The most efficient transfer of parts between the AGV and the interface conveyor requires that the parts be transferred directly between the AGV and the interface conveyor without any intervening part handling. Therefore, the interface conveyor must have upper and lower crossfeed conveyors at the same height as the upper and lower conveyors on the AGV. Further, given the above dimensional parameters, the upper crossfeed conveyor on the interface conveyor must confine all of its mechanical and drive components within a space of about 5 inches. Applicant is not aware of any commercially available crossfeed conveyor that can be used with only about 5 inches of available space.

Consequently, there is a need for a conveyor system that permits a transfer of parts directly between multiple conveyors on the AGV described above and multiple crossfeed conveyors on another conveyor system without using an intervening material handling device.

SUMMARY OF THE INVENTION

The present invention provides a simple, compact, inexpensive and reliable multidirectional conveyor that can exchange parts between a roller conveyor and another conveyor perpendicular to the direction of travel of the roller conveyor. The multidirectional conveyor is especially useful for those applications in which floor space is at a premium, and it is desired to minimize the area consumed by the conveying elements.

According to the principles of the present invention and in accordance with the preferred embodiments, the invention provides a multidirectional conveyor section for moving an article in two different directions. The conveyor has a first roller conveyor mounted on a frame with at least two rollers adapted to move the article in a first direction. A first belt conveyor is mounted between the two rollers of the first roller conveyor and is operable to move the article in a second direction different from the first direction. A first cylinder is connected to the frame and has a first cylinder rod connected to the first belt conveyor. The first cylinder moves the first belt conveyor vertically between a first position above the first roller conveyor and a second position below the first roller conveyor to facilitate an exchange of the article between the first roller conveyor and the first belt conveyor.

In one aspect of the invention, the multidirectional conveyor section has a second roller conveyor mounted on the frame below the support with at least two rollers adapted to move the article in the first direction. A second belt conveyor is mounted between the two rollers of the second roller conveyor and moves the article in a second direction different from the first direction. A second cylinder is connected to the frame and has a cylinder rod connected to the second belt conveyor, the second cylinder is capable of moving the second belt conveyor between a first position above the second roller conveyor and a second position below the second roller conveyor to facilitate an exchange of the article between the second roller conveyor and the second belt conveyor.

In another embodiment of the invention, a method is provided for transferring an article between an interface conveyor and an article transporter. First, the article transporter is located adjacent one side of the interface conveyor. The interface conveyor has a first belt conveyor disposed between adjacent rollers of a first roller conveyor. The first belt conveyor is lifted to a first vertical position above the first roller conveyor and aligned with the first article conveyor on the article transporter. The article is transferred between a first article conveyor on the article transporter and the first belt conveyor on the interface conveyor. Thereafter, the first belt conveyor is lowered to a second vertical position below the first roller conveyor.

These and other objects and advantages of the present invention will become more readily apparent during the following detailed description taken in conjunction with the drawings herein.

DETAILED DESCRIPTION OF THE INVENTION

Figure 1:
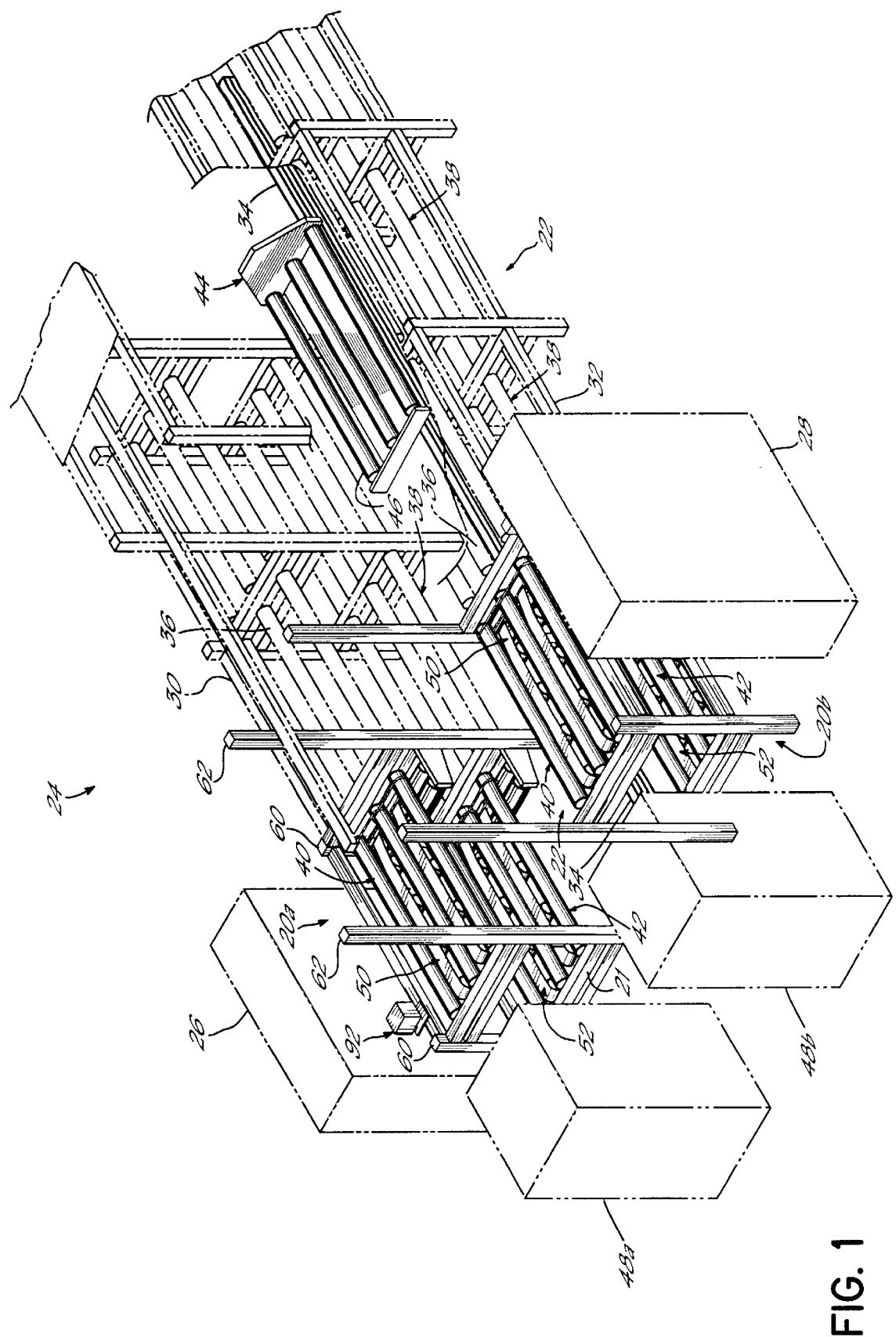
FIG. 1 is a perspective view of an interface conveyor that includes a bidirectional conveyor in accordance with the principles of the present invention.

Referring to FIG. 1, multidirectional conveyor sections 20a, 20b are illustrated at an end 21 of an interface conveyor 22. The interface conveyor 22 is a buffer or queue for preprocessed parts and postprocessed parts. In the illustrated embodiment, the interfaced conveyor 22 is part of an article handling system 24; and the interface conveyor 22 exchanges parts with first and second processing stations 26, 28. The processing stations 26, 28 are located on opposite sides and adjacent the end 21 of interface conveyor 22. The interface conveyor 22 is comprised of a plurality of parallel conveyor sections 30, 32 extending along each side of the interface conveyor 22.

Each of the conveyor sections 30, 32 is comprised of an upper roller conveyor 36, 38, respectively. Preprocessed and the postprocessed parts are exchanged between the upper and lower roller conveyors 36, 38 and the processing stations 26, 28 in a direction substantially perpendicular to the longitudinal centerline of the interface conveyor 22. Preprocessed and postprocessed parts are also moved between the upper and lower roller conveyors 36, 38 of the conveyor sections 30, 32 and an exchange conveyor 46. The exchange conveyor 46 is mounted on a truck 44 that rides along a guide rail 34 extending parallel to a longitudinal centerline of the interface conveyor 22. The conveyor 46 can be elevated vertically with respect to the truck so that the exchange conveyor 46 is operatively aligned with the upper and lower sidefeed roller conveyors 36, 38 of any of the conveyor sections 30, 32.

Each of the multidirectional conveyor sections 20a, 20b of the interface conveyor 22 has upper and lower sidefeed roller conveyors 40, 42, respectively, to exchange preprocessed and postprocessed parts with the respective processing stations 26, 28. Each of the multidirectional conveyor sections 20a, 20b is also capable of transferring preprocessed and postprocessed parts to and from a parts transporter 48, for example, an automatic guided vehicle ("AGV"). Each of the multidirectional conveyor sections 20a, 20b has upper and lower crossfeed conveyors 50, 52 at an elevation permitting a direct exchange of preprocessed and postprocessed parts with upper and lower conveyors (not shown) on respective AGV's 48a and 48b. Preprocessed and postprocessed parts are exchanged between the crossfeed conveyors 50, 52 of the multidirectional conveyor sections 20a, 20b and the AGV's 48a, 48b in a direction that is substantially perpendicular to the direction of motion of the roller conveyors 40, 42 and substantially parallel to the longitudinal axis of the interface conveyor 22.

Figure 2:
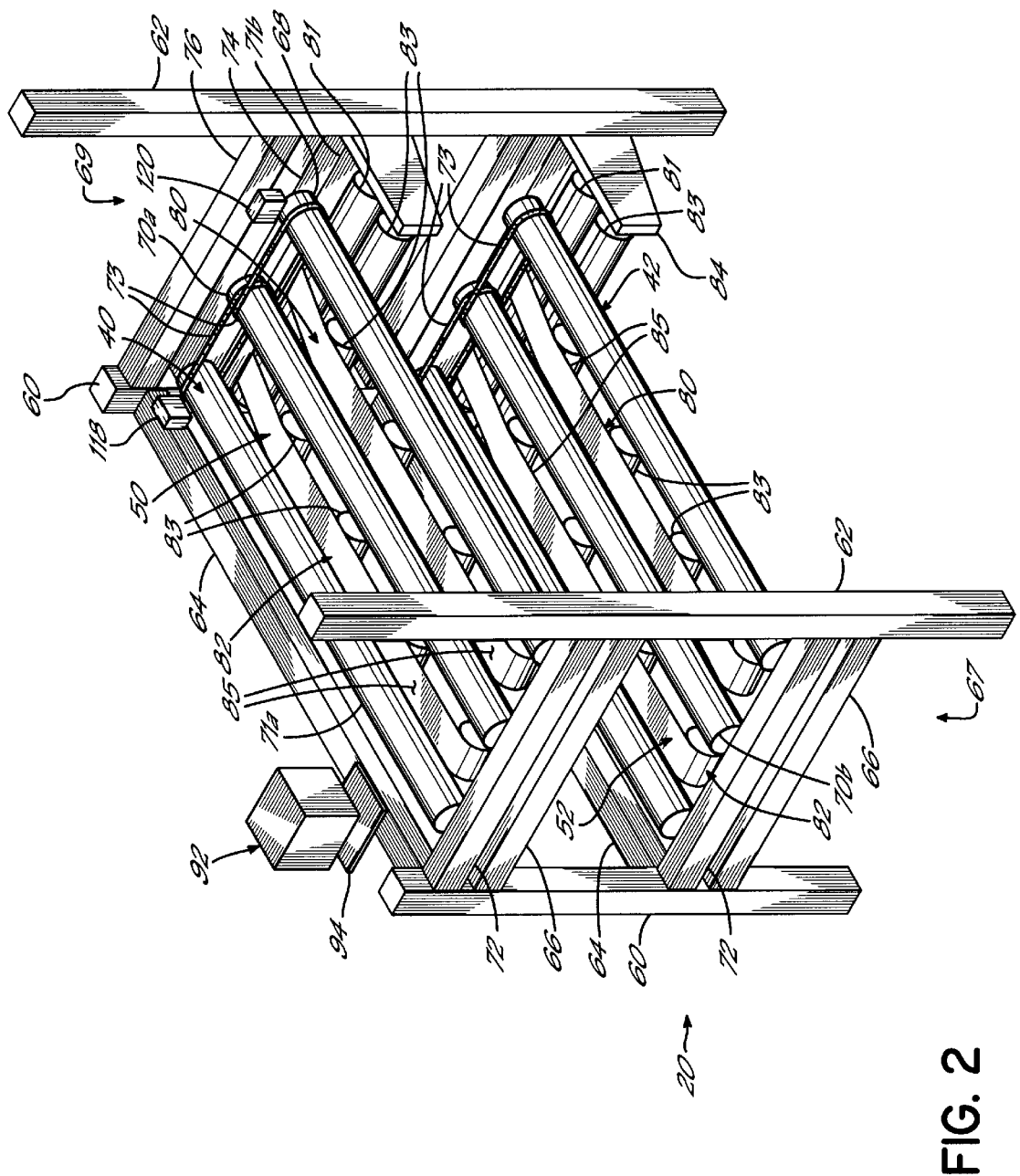
FIG. 2 is a top perspective view of the bidirectional conveyor of FIG. 1.
Figure 3:
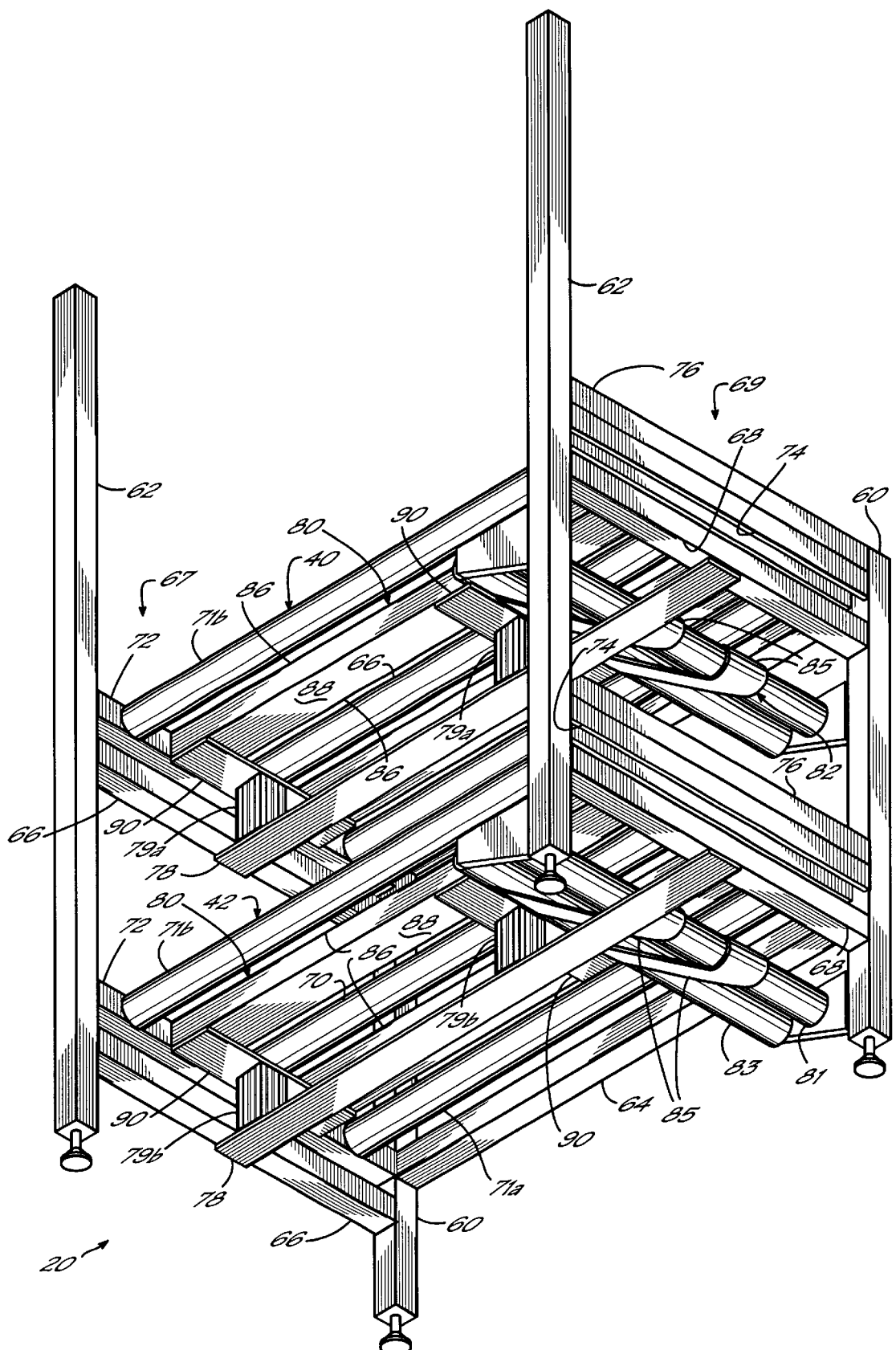
FIG. 3 is a bottom perspective view of the bidirectional conveyor of FIG. 1.

The multidirectional conveyor sections 20a, 20b are essentially identical in construction except that conveyor section 20b is a mirror image of conveyor section 20a. Therefore, the following discussion relating to the structure and operation of the multidirectional conveyor section 20a is also applicable to the multidirectional conveyor section 20b. Referring to FIGS. 2 and 3, the multidirectional conveyor 20 is comprised of a pair of outside uprights 60 and a pair of inside uprights 62. The outside uprights 60 are separated by a pair of forward siderails 64. The uprights 60, 62 are separated at the outer end 67 by outer rails 66; and the uprights 60, 62 of an inner end 69 are separated by inner rails 68. In order to provide more clearance for the exchange of parts between the multidirectional conveyor 20a and the AGV 48, the outer rails 66 are slightly longer, for example, approximately one inch longer, than the inner rails 68.

The upper and lower roller conveyors 40, 42 are identical in construction, and therefore, the following description of the structure and operation of the upper conveyor 40 also applies to the structure and operation of the lower conveyor 42. The upper roller conveyor 40 is comprised of a centrally located, powered side-feed roller 70a that is drivingly connected to two idler side-feed rollers 71 by O-ring belts 73 in a known manner. The side-feed rollers 70a, 71 are rotatably mounted at the outer end 67 to an outer side-feed support rail 72. The support rail 72 is also connected to respective outside and inside uprights 60, 62. The inner ends of the side-feed rollers 70a, 71 are rotatably connected to an inner side-feed support rail 74 that has a C-channel cross-sectional profile. The inner side-feed support rail 74 is rigidly connected to a stop rail 76 that extends at the inner end 69 between respective uprights 60, 62. The stop rail 76 operates as a positive stop to prevent excessive crossfeed travel of parts being moved by the upper crossfeed conveyor 50 on the multidirectional conveyor 20a. The outer side-feed support rail 72 is slightly longer than the inner side-feed support rail 74 and the stop rail 76, for example, approximately one inch longer.

Figure 4:
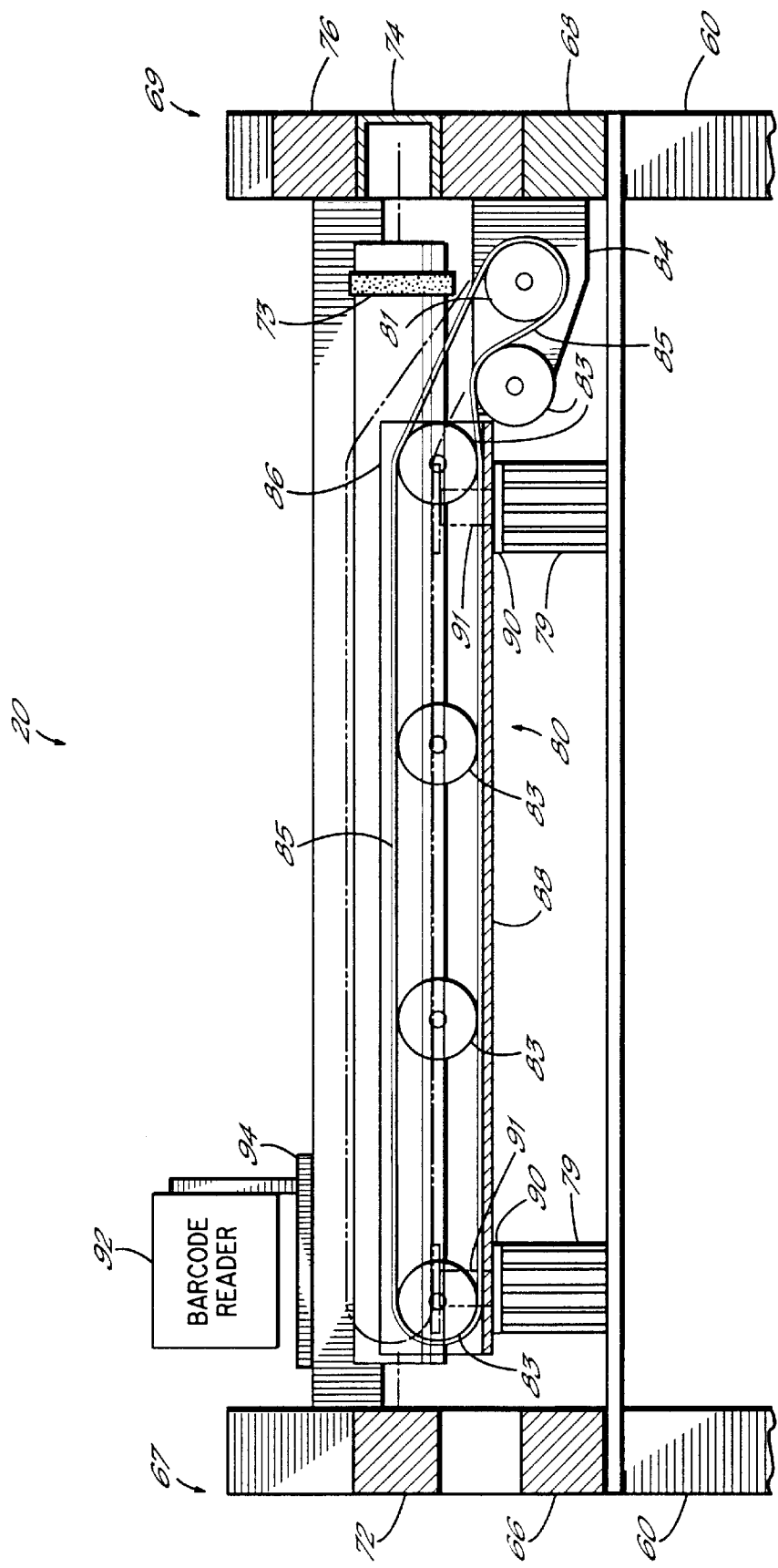
FIG. 4 is a side view of the bidirectional conveyor of FIG. 1.

The upper and lower crossfeed conveyors 50, 52 are identical in construction, and therefore, the following description of the structure and operation of the upper crossfeed conveyor 50 also applies to the structure and operation of the lower crossfeed conveyor 52. As shown in FIG. 3, a cylinder support plate 78 is rigidly connected to, and extends between, the outer rail 66 and a corresponding inner rail 68. A pair of fluid cylinders 79 is mounted on the cylinder support plate 78. The upper crossfeed conveyor 50 is comprised of an inside belt conveyor 80 and an outside belt conveyor 82. The outside belt conveyor 82 is disposed between the center roller 70a and the outer idler roller 71a of the upper roller conveyor 40, and the inside belt conveyor 80 is disposed between the center roller 70a and the outer idler roller 71b of the upper roller conveyor 40. Each of the belt conveyors 80, 82 is identical in structure and operation. Referring to FIG. 4, belt conveyor 80 has a powered roller 81 and an idler roller 83 rotatably mounted at their ends between a pair of brackets 84. Other idler rollers 83 are rotatably mounted within an opposed pair of idler support rails 86 (FIG. 3). The idler support rails 86 are the sides of a C-channel having a bottom 88 mounted to a pair of cross brackets 90. The cross brackets 90 are mounted to respective moveable pistons 91 (shown in phantom in FIG. 4) of the cylinders 79. A belt 85 extends over the powered roller 81 and idler rollers 83, thereby providing a conveying medium for moving parts on the crossfeed conveyor 50.

The uprights 60, 62, rails 64, 66, 68, 72, 76 are normally of the same cross-sectional area. The uprights 60, 62 and rails 64, 66, 68, 72, 76 can be made from any material suitable for such structural members, for example, extruded aluminum beams and associated fasteners commercially available from MB Kit Systems Ltd. of Akron, Ohio. The assembly of the rails 64, 66, 68, 72, 76 and uprights 60, 62 is made by tapping a center through-hole in the ends of the rails 64, 66, 68, 72, 76, drilling clearance holes through the sides of the uprights 60, 62 at the appropriate locations, and using a threaded fastener to connect the assembly together. Conveyor components for roller conveyors 40, 42 and crossfeed conveyors 50, 52 are commercially available from Interroll Corporation of Wilmington, N.C., and the cylinders 79 are commercially available from Taylor Newcomb of Indianapolis, Ind.

Figure 5:
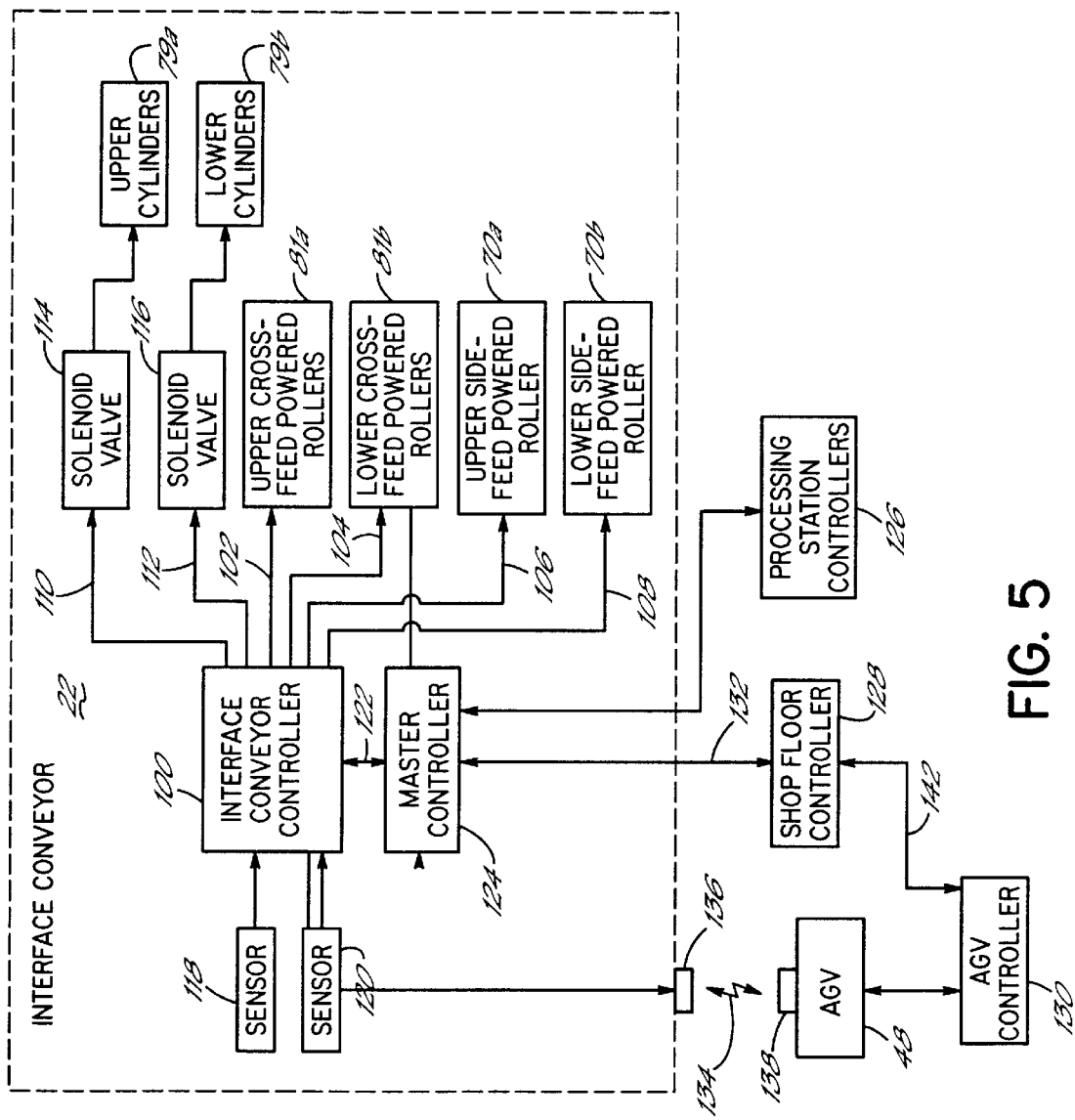
FIG. 5 is a schematic block diagram of the components used to control the multidirectional conveyor of FIG. 1.

Referring to FIG. 5, the interface conveyor 22 includes an interface conveyor controller 100 which provides output signals on lines 102–108 to independently operate the respective upper and lower crossfeed and sidefeed powered rollers 81a, 81b, 70a, 70b. In addition, at the appropriate time, the interface controller 100 provides command signals on outputs 110, 112 to independently operate respective solenoid valves 114, 116. When actuated, the solenoid valves 114, 116 port pressurized air to respective pairs of upper and lower cylinders 79a, 79b, thereby causing the pairs or cylinders 79a, 79b to either extend or retract their respective cylinder rods 91 (shown in phantom in FIG. 4).

The presence and absence of a pallet or tote on the multidirectional conveyor 20a is detected by proximity sensors 118, 120 (FIG. 2). The sensors 118, 120 are used in association with the operation of the upper sidefeed and crossfeed conveyors 40, 50, respectively. The proximity sensor 118 is used to detect the presence of a part or tote transferred onto the multidirectional conveyor 20a by the crossfeed conveyor 50. The proximity sensor 120 is used to detect the presence of a part or tote that has been moved onto the multidirectional conveyor 20a by the roller conveyor 40. The proximity sensors 118, 120 are often photoreflective sensors, but may be any other type of known proximity sensor suitable for the purpose and environment. Identical sensors (not shown) are used for identical purposes with respect to the operation of the respective lower sidefeed and crossfeed conveyors 42, 52.

The interface controller 100 is in electrical communication via a communications link 122 with a master controller 124. Interface controller 100 is normally a commercially available programmable logic controller and the master controller 124 is normally a commercially available personal computer which is ruggedized for use in a manufacturing environment. The master controller 124 provides communications with other controllers in the manufacturing environment, for example, controllers 126 associated with the processing stations 26, 28, a shop floor controller 128 and an AGV controller 130. The communications link 132 between the master controller 124 and the shop floor controller 128 is normally a hard wired link but may also be an RF wireless communication link. Since the AGV 48 and its associated controller 130 are moving along paths within the manufacturing or warehousing facility, the communications link 134 is normally a wireless communications link, for example, an RF communications link. The RF communications link is implemented using a transmitter/receiver or transceiver 136 located on the interface conveyor 22 and a transmitter/receiver or transceiver 138 located on the AGV 48.

In use, the shop floor controller 128 normally coordinates the flow of material through the manufacturing facility. The material, for example, optical discs, are stacked on spindles which, in turn, are loaded into totes or pallets. When fully loaded, each tote weighs over 100 pounds. During the manufacturing process, assume that it is desired to move a tote of discs on the AGV 48 to the interface conveyor 22. Upon the AGV 48 accepting a tote, an identification code for the tote on the AGV 48 is transferred to the AGV controller 130. The identification of the tote being carried by the AGV 48 is stored in the AGV controller 130. The shop floor controller 128 then provides a message over communication link 142 to the AGV controller 130 commanding the AGV 48 to move to a docking station location adjacent a multidirectional conveyor 20 of the interface conveyor 22. Control of the AGV 48 is well known and is not part of the present invention. As the AGV 48 approaches the end 21 of the interface conveyor 22, it moves to a docking station location in a known manner and the receiver/transmitters 136, 138 initiate communication between the AGV controller 130 and the master controller 124. The AGV controller 130 transmits a signal to the master controller 124 indicating that the AGV 48 having a particular identification code is at the docking station and ready to initiate a transfer of a pallet.

After determining that the AGV 48 is properly docked, assume that a tote is to be transferred from an upper conveyor on the AGV 48 to the upper crossfeed conveyor 50. The master controller 124 commands the interface conveyor controller 100 to provide command signals over an output line 110 to operate the respective solenoid valve 114, thereby causing the upper pair of cylinders 79a to extend a cylinder rod and elevate the upper crossfeed conveyor 50 to its raised position. In raising the upper crossfeed conveyor 50, the belt 85, which is normally made from a urethane material, stretches slightly. In the raised position, the upper crossfeed conveyor 50 is about 5 millimeters above a support plane of the upper roller conveyor 40 and provides an unobstructed path for the tote immediately above the upper roller conveyor 40. The interface conveyor controller 100 receives signals from the upper cylinders 79a that the cylinder is in its raised position. Thereafter, the interface conveyor controller 100 provides a signal to the master controller 124 indicating that the multidirectional conveyor 50 is ready to receive a tote. That state of readiness is then provided to the shop floor controller 128 which then provides a tote transfer command to the master controller 124 and the AGV controller 130.

The master controller 124 then provides an initiate transfer command to the interface conveyor controller 100 that, in turn, provides a command signal over line 102 causing the upper crossfeed powered rollers 81 on the inner and outer belt conveyors 80, 82 to start. Rotation of the powered rollers 81 drives the respective belts 85 of the inner and outer belt conveyors 80, 82. Simultaneously, the AGV controller 130 is commanding an upper conveyor on the AGV 48 to operate so as to move a tote generally from left to right as viewed in FIG. 1, thereby transferring the tote onto the upper crossfeed conveyor 50. The interface conveyor controller 100 then detects that the proximity sensor 118 changes state indicating that the tote is loaded onto the upper crossfeed conveyor 50. A bar code reader 92 mounted on a bracket 94 reads a bar code on the tote identifying the parts in the tote and transfers that part identity to the interface conveyor controller 100. The interface conveyor controller 100 then changes the state of the signal on output 106 causing the upper end feed motorized rollers to stop.

Thereafter, the interface conveyor controller 100 changes the state of the signal on output 110, thereby changing the state of solenoid 114. The new state of solenoid valve 114 causes the pair of upper cylinders 79a to retract their cylinder rods and lower the belt conveyors 80, 82 of the upper crossfeed conveyor 50 to a position below, for example, about 10 millimeters below, the support plane of the upper roller conveyor 40. As the upper crossfeed conveyor is lowered by the pair of upper cylinders 79a, the support of the tote is transferred from the upper crossfeed conveyor 50 to the upper roller conveyor 40. The interface conveyor controller 100 receives a signal from the upper cylinders 79a indicating that the cylinder rod is retracted to its lowermost position. At this point, the tote is resting on the upper roller conveyor 40.

The interface conveyor controller 100 then transfers data to the master controller 124 indicating that the tote has been successfully loaded onto the upper crossfeed conveyor 50 and the master controller 124 then passes that data on to the shop floor conveyor 128. As will be appreciated, a similar process can be used to transfer a tote of parts from the upper crossfeed conveyor 50 to an upper conveyor of the AGV 48. The AGV 48 has two conveyors, and therefore, as will be appreciated, a similar process can be used to transfer a tote to or from a lower conveyor of the AGV 48 and the lower crossfeed conveyor 52. The transfer of totes from the upper and lower conveyors on the AGV 48 to the upper and lower crossfeed conveyors, 50, 52, respectively, can be done sequentially or simultaneously.

At appropriate times, the interface conveyor controller 100 provides output signals on lines 106, 108 to operate the powered sidefeed roller 70 to transfer a tote between the sidefeed roller conveyor 40 and either processing station 26 or transfer conveyor 46. The other sidefeed roller conveyors 42, 36, 38 have a similar structure and operation as the sidefeed roller conveyor 40.

The present invention provides a simple, compact, inexpensive and reliable multidirectional conveyor section 20 that can exchange parts between a roller conveyor on the conveyor section 20 and another conveyor perpendicular to the direction of travel of the roller conveyor. The multidirectional conveyor section 20 can carry totes or pallets that weigh in excess of 100 pounds. Further, the multidirectional conveyor section 20 provides upper and lower crossfeed conveyors. 50, 52 that have a common elevation with upper and lower conveyors on an AGV. Therefore, the multidirectional conveyor section 20 can exchange pallets or totes directly with AGV's without an intermediate transfer device. In the application of interest, the totes are about 13 inches wide and 27 inches long. Further, the parts in the totes are about 12 inches high, but there is only about 17 inches of vertical spacing between the upper and lower conveyors on the AGV. With the described design of the multidirectional conveyor 20, all of the mechanics and drives for both the upper roller conveyor 40 and the upper belt conveyor 50 are located in less than 5 inches of vertical space. Thus, the multidirectional conveyor section 20 is especially useful for those applications in which floor space is at a premium, and it is desired to minimize the area consumed by the conveying elements.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment of FIG. 4, four idler rollers 83 are used to support the belt 85 in the conveying plane of the crossfeed conveyors 50, 52. However, as will be appreciated, any number of idler rollers 83 may be used to properly support the load on the crossfeed conveyors 50, 52. In the described embodiment, each of the crossfeed conveyors 50, 52 uses two belt conveyors 80, 82, and one of the belt conveyors is disposed between each pair of the three rollers 70, 71 of the roller conveyors 40, 42. As will be appreciated, the roller conveyors 40, 42 may have more or fewer idler rollers, and the crossfeed conveyors 50, 52 may have more or fewer belt conveyors. In the described embodiment of FIG. 1, two multidirectional conveyor sections 20a, 20b are shown at one end of the interface conveyor 22. As will be appreciated, only one multidirectional conveyor may be used, or alternatively, one or more multidirectional conveyor sections 20 may be used at both ends of the interface conveyor 22.

Therefore, the invention in its broadest aspects is not limited to the specific details shown and described. Consequently, departures may be made from the details described herein without departing from the spirit and scope of the claims which follow.

What is claimed is:

1. A multidirectional conveyor section for moving an article in two different directions comprising:
    a frame;
    a first roller conveyor mounted on the frame and having at least two rollers adapted to move the article in a first direction;
    a first belt conveyor mounted between the two rollers of the first roller conveyor and adapted to move the article in a second direction different from the first direction;
    a first support for supporting the first belt conveyor; and
    a pair of first cylinders having respective cylinder rods, the first cylinders being connected to the frame and ends of the cylinder rods being connected to the first support, the first cylinders being operable to move the first belt conveyor vertically between a first position above the first roller conveyor and a second position below the first roller conveyor to facilitate an exchange of the article between the first roller conveyor and the first belt conveyor.

2. The multidirectional conveyor section of claim 1 wherein the frame further comprises:
    a plurality of vertical legs;
    side rails rigidly connected to the legs and determining a length of the frame; and
    cross rails rigidly connected to the legs and determining a width of the frame.

3. The multidirectional conveyor section of claim 2 wherein lower ends of each of the legs has a foot connected to a respective one of the legs for supporting the frame on a surface.

4. The multidirectional conveyor section of claim 1 further comprising:
    a second roller conveyor mounted on the frame below the first roller conveyor and having at least two rollers adapted to move the article in the first direction;
    a second belt conveyor mounted between the two rollers of the second roller conveyor and adapted to move the article in the second direction; and a second cylinder connected to the frame and having a cylinder rod connected to the second belt conveyor, the second cylinder being operable to move the second belt conveyor between a first position above the second roller conveyor and a second position below the second roller conveyor to facilitate an exchange of the article between the second roller conveyor and the second belt conveyor.

5. The multidirectional conveyor section of claim 1 further comprising a first sensor for detecting a presence of the article on the first belt conveyor, the first sensor providing a signal indicating an operation of the first belt conveyor may be stopped.

6. The multidirectional conveyor section of claim 5 further comprising a second sensor for detecting an absence of the article on the first belt conveyor, the second sensor providing a signal indicating an operation of the first belt conveyor may be terminated.

7. The multidirectional conveyor section of claim 1 wherein the first roller conveyor comprises three rollers, the three rollers being operable simultaneously to move the article in the first direction.

8. The multidirectional conveyor section of claim 7 further comprising:
a first belt conveyor mounted on the first support and disposed between a first roller and a second roller of the first roller conveyor; and
a second belt conveyor mounted on the first support and disposed between the second roller and a third roller of the first roller conveyor, the first and second belt conveyors being operable simultaneously to move the article in the second direction.

9. The multidirectional conveyor section of claim 8 wherein each of the first and the second belt conveyors comprises:
a plurality of idler rollers;
a drive roller; and
a closed loop belt extending over the idler rollers and the drive roller, the belt adapted to support the article and being moved in response to operation of the drive roller.

10. A multidirectional conveyor section for moving an article in two different directions comprising:
a frame;
an upper roller conveyor mounted on the frame and having at least two rollers adapted to move the article in a first direction;
an upper belt conveyor mounted between the two rollers of the upper roller conveyor and adapted to move the article in a second direction different from the first direction;
an upper cylinder connected to the frame and having a cylinder rod connected to the upper belt conveyor, the upper cylinder being operable to move the upper belt conveyor vertically between a first position above the upper roller conveyor and a second position below the upper roller conveyor to facilitate an exchange of the article between the upper roller conveyor and the upper belt conveyor;
a lower roller conveyor mounted on the frame below the upper roller conveyor and having at least two rollers adapted to move the article in the first direction;
a lower belt conveyor mounted between the two rollers of the lower roller conveyor and adapted to move the article in the second direction; and a lower cylinder connected to the frame and having a cylinder rod connected to the lower belt conveyor, the lower cylinder being operable to move the lower belt conveyor between a first position above the lower roller conveyor and a second position below the lower roller conveyor to facilitate an exchange of the article between the lower roller conveyor and the lower belt conveyor.

11. The multidirectional conveyor section of claim 10 wherein each of the upper and lower cylinders comprises
a pair of cylinders having respective cylinder rods, the ends of the cylinders being connected to the frame and ends of the cylinder rods being connected to a respective one of the upper and lower belt conveyors.

12. The multidirectional conveyor section of claim 10 wherein the upper and lower belt conveyors are mounted on respective upper and lower support plates.

13. The multidirectional conveyor section of claim 12 wherein each of the upper and lower cylinders comprises a first pair of cylinders having respective cylinder rods, the ends of the cylinders being connected to the frame and ends of the cylinder rods being connected to one of the support plates.

14. The multidirectional conveyor section of claim 13 wherein each of the upper and lower roller conveyors comprises three rollers.

15. The multidirectional conveyor section of claim 14 wherein each of the upper and lower belt conveyors comprises:
a first belt conveyor mounted on one of the support plates and disposed between a first roller and a second roller of one of the roller conveyors; and
a second belt conveyor mounted on the one of the support plates and disposed between the second roller and a third roller of the one of the roller conveyors.

16. A method of transferring an article between an interface conveyor and an article transporter having first and second article conveyors comprising:
locating the article transporter adjacent one side of the interface conveyor, the interface conveyor having first and second belt conveyors disposed between respective pairs of rollers of first and second roller conveyors;
lifting the first belt conveyor to a first vertical position above the first roller conveyor and aligned with the first article conveyor on the article transporter;
transferring an article between the first article conveyor on the article transporter and the first belt conveyor on the interface conveyor;
lowering the first belt conveyor to a second vertical position below the first roller conveyor;
lifting the second belt conveyor to a third vertical position above the second roller conveyor and aligned with the second article conveyor on the article transporter;
transferring an article between the second article conveyor on the article transporter and the second belt conveyor on the interface conveyor; and
lowering the second belt conveyor to a fourth vertical position below the second roller conveyor.

17. The method of claim 16 further comprising:
detecting a presence of the article on the second belt conveyor; and
stopping the operation of the second belt conveyor in response to detecting the presence of the article on the second belt conveyor.

18. The method of claim 16 further comprising:

detecting an absence of the article on the second belt conveyor; and stopping the operation of the second belt conveyor in response to detecting the absence of the material on the second belt conveyor.

19. The method of claim 16 further comprising:

lifting the second belt conveyor to the third vertical position to lift the article off of the second roller conveyor and onto the second belt conveyor;

moving the second belt conveyor in a direction to transfer the article from the second belt conveyor to the article transporter;

stopping the second belt conveyor in response to the article being transferred from the second belt conveyor; and lowering the second belt conveyor to the fourth vertical position.

20. The method of claim 16 further comprising simultaneously transferring one article between the first article conveyor and the first belt conveyor and a second article between the second article conveyor and the second belt conveyor.

21. The method of claim 16 further comprising:

detecting a presence of the article on the first belt conveyor; and stopping the operation of the first belt conveyor in response to detecting the presence of the article on the first belt conveyor.

22. The method of claim 16 further comprising:

detecting an absence of the article on the first belt conveyor; and stopping the operation of the first belt conveyor in response to detecting the absence of the material on the first belt conveyor.

* * * * *